June 19, 1928.
A. L. DUNNAGAN
DUSTING MACHINE
Filed Aug. 24, 1926
1,674,391
2 Sheets—Sheet 1
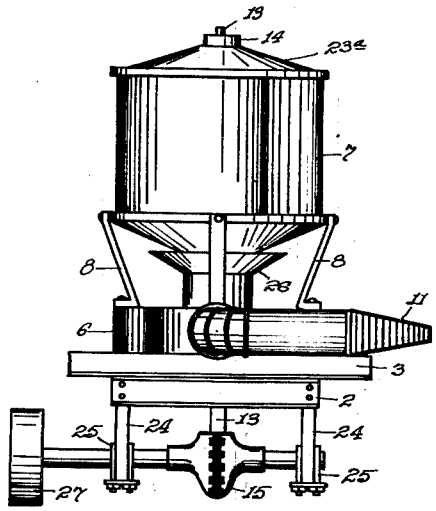
Fig. 1.
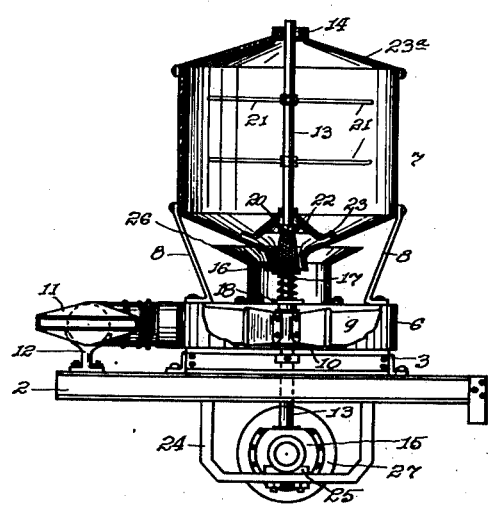
Fig. 2.
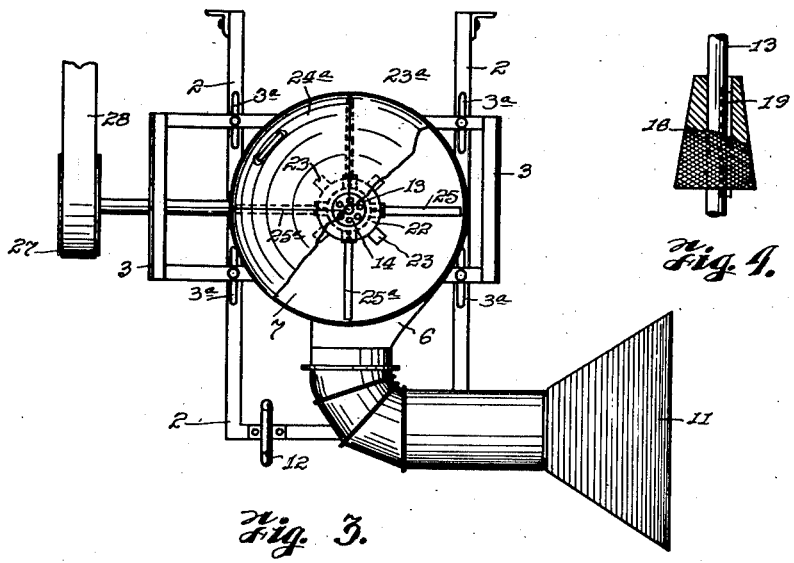
Fig. 3.
Fig. 4.
Albert L. Dunnagan
INVENTOR.
BY
ATTORNEY.

June 19, 1928.  
A. L. DUNNAGAN  
1,674,391  
DUSTING MACHINE  
Filed Aug. 24, 1926 2 Sheets-Sheet 2

Albert L. Dunnagan  
INVENTOR.  
BY G. C. Waldrop  
ATTORNEY.

Patented June 19, 1928.

1,674,391

UNITED STATES PATENT OFFICE.

ALBERT L. DUNNAGAN, OF DALLAS, TEXAS.

DUSTING MACHINE.

Application filed August 24, 1926. Serial No. 131,164.

This invention relates to machines for the extermination of depredatory insects, especially that character of insect commonly known as the boll-weevil, cotton flea, fall army worm and other such insects preying upon cotton and other vegetation, and the invention has for its principal object to provide an economical and wholly efficient machine for the purpose of thoroughly dusting insect infested vegetation with a poisonous mixture in powder form.

The invention further comprehends a machine of the character designated which is capable of discharging a cloud of such poison, and consequently adapted to thoroughly dust an area of indefinite scope, and as a consequence, economy in both time and expense is realized.

A further object of the invention resides in the gravity feeding arrangement, materially aided by an improved feed valve, and draft created by suction fan therebelow, into which the poisonous powder filters preparatory to being discharged thereby, such an arrangement insuring positive and uniform distribution.

With these principal objects in view, the invention consists further of lesser objects, as well as its salient features of construction and assembly of parts, by which the said objects are attained, and which will be manifested in the following detail description and illustrated in the appended drawings, wherein, Figure 1 represents a front view of the improved dusting machine.

Figure 2 is a left side view.

Figure 3 is a top plan view of the invention.

Figure 4 is a detail view, partly in section of the improved feeding valve.

It may be stated in continuing with the invention that other machines and apparatus have heretofore been contrived for dusting insect infested vegetation with poisonous powders and other compositions with an effort to exterminate the insects, and in which a powder hopper, discharge fan and spout are the component elements. The present invention, although employing these elements in its assembly, has arranged the elements in such a way as to constantly filter the powder in suspended quantities into the discharge fan, and during such action, the powder is being thoroughly agitated to prevent possible packing, a characteristic of powder of this nature. A suction is created behind the discharge fan, which constantly aids the natural gravity flow and urges the powder into the discharge fan, thereby preventing accumulation of powder at points in the fan housing where ordinarily no air currents penetrate.

Figure 5:
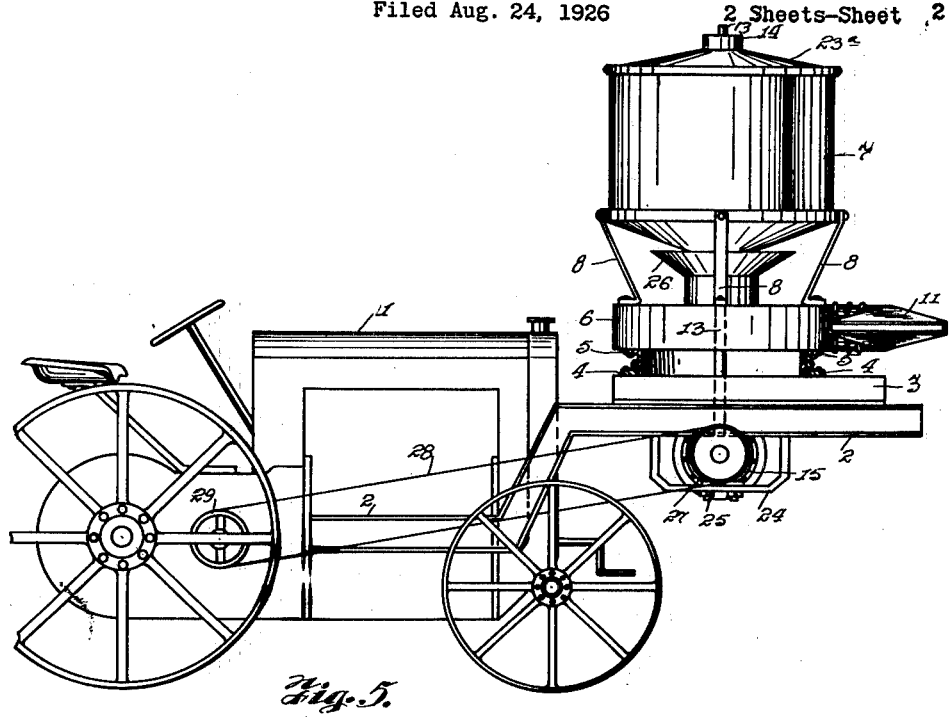
Figure 5 illustrates the dusting machine, showing the supporting frame arranged for organization with a tractor.

While it is not intended that the invention be restricted as to a suitable transporting means, two different types of well known tractors are shown, whereby to comprehensively illustrate a preferable mounting in each case. In Figure 5, a channel iron support 2 is employed, which is substantially bolted to the transmission housing of the tractor, extends forward and is elevated somewhat at the approximate front of the radiator as shown, providing a suitable platform, upon which is bolted or otherwise suitably secured a frame 3. In this particular view, that part of the structure above the frame 3 is adapted to be rotatable with respect to the lower elements, and to attain such rotation, an angle iron ring 4 is riveted to the frame 3, while a similar conforming ring 5 is snugly retained by the former ring in rotatable relationship as illustrated. The ring 5 is affixed to a fan housing 6 immediately thereabove, which in turn supports the material hopper 7 through legs 8.

While no material departure from the other views shown exists in the structure just described, aside from the rotating feature of the hopper and fan, the same reference characters will be used to denote corresponding parts of the other views.

Figure 6:
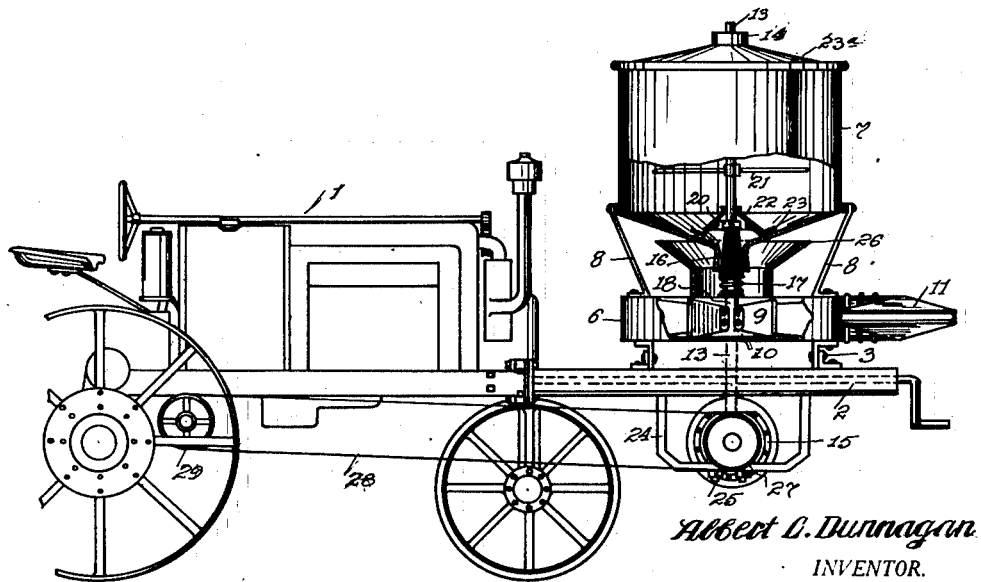
Figure 6 is a modified example of the supporting frame as applied to a tractor of a different type.

In Figures 1, 2 and 6, the fan housing 6 is shown as being affixed directly upon the frame 3, and in so doing the arrangement shown at 4 and 5 on Figure 6 is dispensed with. The conventional vertical bladed fan 9 is rotatably mounted within the housing 6, as particularly apparent in Figures 2 and 6, and has therebelow an integral conical disc 10, to deflect the material which might otherwise pass through the fan and escape the current created thereby.

A discharge spout 11 is formed upon the fan housing, and is so arranged through a conventional elbow joint as to be directed at right angles to the direction of travel, or may if desired, be removed and the elbow dispensed with so as to discharge the commodity directly in front of the machine. A suitable support 12 is arranged upon the frame 2, upon which the lateral discharge pipe rests.

Returning now to the discharge fan; a vertical shaft 13 extends unrestrictedly from the top of the hopper 7, where it is mounted in a bearing 14, to a conventional automobile differential 15, to which reference will be later made. It is to this shaft 13 that the fan 4 is affixed.

It will be observed in Figures 2 and 6 that the bottom of the hopper 7 is of funnel shape to insure convergence of material toward the filtering point, which, as apparent in the figures referred to is controlled by a cone shaped valve 16, illustrated in detail in Figure 4. An expansion spring 17 is interposed between the valve 16 and a collar 18 adjacent the fan 9, the purpose of which is to urge the feed valve 16 normally in snug contact with its conforming seat, formed at the filtering point in the bottom of the hopper 7. It will be noted in Figure 4 that the valve 16 has limited vertical movement on the shaft 13, and a key 19 occupies jointly, channels both in the shaft 13 and the interior of the valve in order that the valve may be constrained from rotative movement on the shaft 13. Adjustment of this movement is attained through a collar 20 above the valve, accordingly with the density of the material being handled.

It will be understood that the resiliency of the spring 17 will permit the cone valve 16 to yield to the slightest urge, and since it is constantly rotating, the dust contained in the hopper 7 is sifted through the annular crevice around the valve, although the latter is snugly fitting in its seat. Not infrequently, the commodity becomes lumpy through dampness, and it is for this purpose that the valve is constructed to yield, i. e. to pulverize these hardened particles and those that are of such hardness as to make it difficult for the valve to pulverize them, they are permitted to pass the latter to prevent clogging of the discharge elements of the machine. Moreover, such foreign particles as pebbles, nuts, bolts and the like find a ready escape past the valve before they are permitted to impair the mechanism or hinder the performance of the machine.

Where it is desired to employ the machine for the purpose of distributing fertilizer, which is composed of coarser and harder particles, the collar 20 may be moved downward against the valve and against the resistance of the spring 17, thus placing the valve in approximately the position shown in Figure 2. It may require somewhat greater pressure to displace the valve due to the compressed condition of the spring, but it is still capable of yielding to the valve, so as to enable the latter to pass particles of greater size than material in process of distribution. It is therefore obvious that the yieldability of the spring is always adjustable according to the courseness of the material passed through the valve.

In addition to the several radially arranged agitator arms 21, agitation of the material in the hopper is accomplished by an inverted cone-shaped hood 22 situated directly above the valve 16, provided with outwardly directed fingers 23. The cone 22 and its fingers 23 are more for the purpose of controlling the flow of material than as an agitator, while the arms 21, turned by the shaft 13, keep the material constantly agitated.

Referring to the plan view illustrated in Figure 3, the hopper 7 is shown as being provided with a top 23ª, one quarter of which is hinged to form an opening 24ª for filling. A plurality of ribs 25ⁿ aid in strengthening the hopper.

Intermediate the fan housing 6 and the hopper 7, is situated a funnel shaped member 26. It is through this member that the suction behind the filtered material is obtained, such suction entering between the flange of the member 26 and the bottom of the material hopper 7.

Below the frame 3 are suspended hangers 24, carrying bearings 25, the latter supporting the ends of the differential housing 15. This latter element is composed, as stated previously of a structure embodying an automobile rear axle and differential drive, the ends being reduced in length, and upon one of the ends of the protruding axle a drive pulley 27 is applied, over which a belt 28 passes, the latter surrounding the tractor drive 29. As apparent in Figure 3, a plan view, the frame 3 is arranged through slots 3ª in the support 2, to have limited longitudinal movement with respect to the said support to provide a tightening means for the belt 28. While this differential serves the purpose to which it is applied very nicely, it is not necessary that this arrangement be employed for the purpose designated, as other modified forms of drive may be contrived to operate quite as successfully.

In operation, the hopper 7 is filled with a poisonous powder of a predetermined strength, and as the wind is a considerable factor in the adequate performance of the machine, the wind direction is determined and the nozzle is turned in order that the discharge will be with the wind. The usual discharge without the aid of the wind is approximately between fifty and one hundred feet, and aided by the wind, the cloud of poisonous powder discharged is carried thereby over a large area to settle upon the vegetation without material waste.

In some instances, the invention has been proven of unestimable benefit in spreading fertilizer, and in this regard is aided considerably by the capability of the filtering valve 16 of adjusting itself to the material being handled, irrespective of its density. It has been found that more effective results may be obtained by removing the elbow in the discharge line and applying the nozzle 11 directly upon the fan housing in order that the discharge will be directed in line with the path of travel.

It is clearly apparent that regardless of the material handled, uniformity of discharge is attained and consequently thorough distribution is the result.

Manifestly, the construction shown and described is capable of considerable modification, and such modification as is within the scope of the appended claims is considered within the spirit and intent of the invention.

I claim:

1. A powder dusting machine having a powder hopper provided with a discharge opening; a fan housing below said opening having a discharge spout; a fan mounted in said housing; a shaft vertically positioned within said fan housing and hopper; a valve carried by said shaft and arranged to operatively control said discharge opening, said valve arranged for movement on said shaft; a collar above said valve; an expansile spring below said valve whereby to permit the latter to yield to the material passing through said discharge opening; and means to admit air to the suction end of the fan adjacent said discharge opening.

2. A dusting apparatus including a powder hopper having a discharge opening; a shaft extending through said hopper and carrying a plurality of agitating fingers; an inverted conical valve in control of said discharge opening also carried by said shaft and capable of vertical movement with respect to said shaft and opening; means carried by the shaft to limit such movement; means below the valve urging the latter toward the limiting means and permitting the valve to automatically yield to the material passing thereby; an encased fan supported below said valve and provided with a discharge spout, and an air intake means arranged adjacent to said hopper discharge opening and communicating with said fan casing.

3. A dusting machine including a fan housing; a hopper supported above said fan housing having a discharge opening; a vertical shaft extending through said hopper and fan housing; a fan carried by said shaft in said fan housing; a moving valve carried also by said shaft and arranged to operatively enter the discharge opening of said hopper, means to permit said valve to yieldingly move to and away from said opening according to the coarseness of material passing thereby, and an air intake arranged adjacent said valve and communicating with said fan housing.

In testimony whereof I affix my signature.

ALBERT L. DUNNAGAN.